US012415360B2

(12) United States Patent
Iida et al.

(10) Patent No.: US 12,415,360 B2
(45) Date of Patent: Sep. 16, 2025

(54) CONTROLLER, CONTROL METHOD, AND IMAGE RECORDING DEVICE

(71) Applicant: BROTHER KOGYO KABUSHIKI KAISHA, Nagoya (JP)

(72) Inventors: Shotaro Iida, Nagoya (JP); Hiroshi Taira, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 177 days.

(21) Appl. No.: 18/055,871

(22) Filed: Nov. 16, 2022

(65) Prior Publication Data

US 2023/0150266 A1 May 18, 2023

(30) Foreign Application Priority Data

Nov. 16, 2021 (JP) ................................ 2021-186669

(51) Int. Cl.

*B41J 2/165* (2006.01)
*B41J 2/045* (2006.01)
*B41J 2/14* (2006.01)

(52) U.S. Cl.

CPC ....... *B41J 2/16552* (2013.01); *B41J 2/04503* (2013.01); *B41J 2002/14322* (2013.01)

(58) Field of Classification Search

CPC ................ B41J 2/16552; B41J 2/04503; B41J 2002/14322; B41J 2002/16558; B41J 2/16517; B41J 2/16541; B41J 2/16538

USPC ........................................................... 347/22

See application file for complete search history.

(56) References Cited

U.S. PATENT DOCUMENTS 6,460,967 B1 10/2002 Makita et al.
2002/0171705 A1* 11/2002 Rhoads ................ B41J 2/16538 347/33
2005/0231548 A1* 10/2005 Tsukada ............... B41J 2/16535 347/33

FOREIGN PATENT DOCUMENTS

JP H11-334095 A 12/1999

* cited by examiner

*Primary Examiner* — Jason S Uhlenhake
*Assistant Examiner* — Alexander D Shenderov
(74) *Attorney, Agent, or Firm* — Scully, Scott, Murphy & Presser, P.C.

(57) ABSTRACT

There is provided a controller for an image recording device. The image recording device includes: a carriage capable of moving in a first direction; a head mounted on the carriage and configured to discharge a liquid from a nozzle; and a wiper capable of being impregnated with a cleaning liquid, a nozzle surface of the head including a first region not having the nozzle and a second region having the nozzle. The controller is configured to execute: a pressing-against processing of abutting the wiper on the first region in a state in which a speed of a relative movement in the first direction between the carriage and the wiper is a first speed; and a moving processing of moving the carriage and the wiper relative to each other in the first direction at a second speed faster than the first speed, while abutting the wiper on the second region.

10 Claims, 10 Drawing Sheets

CONTROLLER, CONTROL METHOD, AND IMAGE RECORDING DEVICE

REFERENCE TO RELATED APPLICATIONS

This application claims priority from Japanese Patent Application No. 2021-186669 filed on Nov. 16, 2021. The entire content of the priority application is incorporated herein by reference.

BACKGROUND ART

There is known an image recording device comprising a head and a carriage mounted with the head, that discharges ink from nozzles of the head when the carriage moves in a predetermined direction. In the image recording device, a wipe processing in which a nozzle surface of the head is wiped by a wiper is executed to remove an unnecessary object (the likes of ink or a contaminant) that has adhered to the nozzle surface.

As the wipe processing, there is known a method by which a cleaning liquid is caused to adhere to the nozzle surface by the wiper that has been impregnated with the cleaning liquid, and the cleaning liquid or unnecessary object that have adhered to the nozzle surface are wiped away. Sometimes, in this method, if an amount of the cleaning liquid provided to the nozzle surface is too large, then when the wiper separates from the nozzle surface, the cleaning liquid or unnecessary object that have been wiped away by the wiper will scatter. In this context, there is known a liquid discharge device in which a squeezing roller is pressed against a wiping member having liquid impregnatable properties so as to squeeze the wiping member.

DESCRIPTION

In the liquid discharge device described in Japanese Patent Publication Laid-Open No. H11-334095, a plurality of dedicated members is required to press the squeezing roller against the wiping member, hence configuration of the device becomes complicated.

The present disclosure, which was made in view of the above-described circumstances, has an object of providing a means by which wipe processing employing a suitable amount of a cleaning liquid can be executed by a simple configuration.

(1) A controller according to the present disclosure is a controller for an image recording device, the image recording device including: a carriage capable of moving in a first direction; a head which is mounted on the carriage and which is configured to discharge a liquid from a nozzle; and a wiper capable of being impregnated with a cleaning liquid, a nozzle surface of the head including a first region not having the nozzle and a second region having the nozzle, the controller being configured to execute:

a pressing-against processing of abutting the wiper on the first region in a state in which a speed of a relative movement in the first direction between the carriage and the wiper is a first speed; and a moving processing of moving the carriage and the wiper relative to each other in the first direction at a second speed faster than the first speed, while abutting the wiper on the second region.

The above-described controller results in that, by a pressing-against processing being executed, a wiper impregnated with a cleaning liquid is squeezed, and the cleaning liquid impregnating the wiper can be reduced to a suitable amount. The pressing-against processing can be executed without a dedicated member being employed. Hence, by executing a moving processing after the pressing-against processing, a wipe processing employing a suitable amount of the cleaning liquid can be executed by a simple configuration.

(2) The first speed may be zero.

(3) The first speed may be greater than zero.

(4) The image recording device may further include an additional wiper not capable of being impregnated with the cleaning liquid; and in the moving processing, the carriage and the additional wiper are moved relative to each other in the first direction at the second speed, in a state in which the additional wiper abuts on the second region.

(5) The pressing-against processing may be executed in a state in which the additional wiper abuts on a side surface of the head.

(6) In the pressing-against processing, the carriage and the wiper may be moved relative to each other in a moving direction; and then, in the moving processing, the carriage and the wiper may be moved relative to each other in the moving direction, without being moved relative to each other in a direction opposite to the moving direction.

(7) The controller may be configured to:

after the moving processing, move the carriage and the wiper relative to each other, in a state in which the wiper does not abut on the head, until the wiper is located relative to the head at a starting position or at a position further from an ending position as compared with the starting position, the starting position being a position of the wiper relative to the head when the moving processing is started, the ending position being a position of the wiper relative to the head when the moving processing is ended; and execute the moving processing again.

(8) The controller may be configured to execute the pressing-against processing for one second or more.

(9) A control method according to the present disclosure is a control method for an image recording device, the image recording device including: a carriage capable of moving in a first direction; a head which is mounted on the carriage and which is configured to discharges a liquid from a nozzle; and a wiper capable of being impregnated with a cleaning liquid, a nozzle surface of the head including a first region not having the nozzle and a second region having the nozzle, the control method comprising:

executing a pressing-against processing of abutting the wiper on the first region in a state in which a speed of a relative movement in the first direction between the carriage and the wiper is a first speed; and executing a moving processing of moving the carriage and the wiper relative to each other in the first direction at a second speed faster than the first speed, while abutting the wiper on the second region.

(10) An image recording device according to the present disclosure includes:

a carriage capable of moving in a first direction;

a head which is mounted on the carriage and which is configured to discharge a liquid from a nozzle;

a wiper capable of being impregnated with a cleaning liquid; and a controller, wherein a nozzle surface of the head includes a first region not having a nozzle and a second region having a nozzle, and the controller is configured to execute:

a pressing-against processing of abutting the wiper on the first region in a state in which a speed of a relative movement in the first direction between the carriage and the wiper is a first speed; and a moving processing of moving the carriage and the wiper relative to each other in the first direction at a second speed faster than the first speed, while abutting the wiper on the second region.

(11) A controller according to the present disclosure is a controller for an image recording device, the image recording device including: a carriage capable of moving in a first direction; a head which is mounted on the carriage and which is configured to discharge a liquid from a nozzle; and a wiper capable of being impregnated with a cleaning liquid, a nozzle surface of the head including a first region not having the nozzle and a second region having the nozzle, the controller being configured to execute:

a pressing-against processing of abutting the wiper on the first region to deform the wiper such that at least part of the cleaning liquid absorbed in the wiper is separated from the wiper; and a wiping processing of wiping the second region with the wiper after the pressing-against processing.

(12) The wiping processing may include wiping the second region with the wiper while moving the head and the wiper relative to each other in the first direction, the wiper may be a plate member, a thickness direction of the wiper being the first direction, and the wiper may be configured to bend by a force in the first direction applied by the head in the pressing-against processing.

(13) The pressing-against processing may include abutting the wiper on the first region in a state in which a speed of a relative movement in the first direction between the carriage and the wiper is a first speed; and the wiping processing may include moving the carriage and the wiper relative to each other in the first direction at a second speed faster than the first speed.

(14) The first speed may be zero.

The present disclosure results in that a wipe processing employing a suitable amount of a cleaning liquid can be executed by a simple configuration.

Figure 5A:
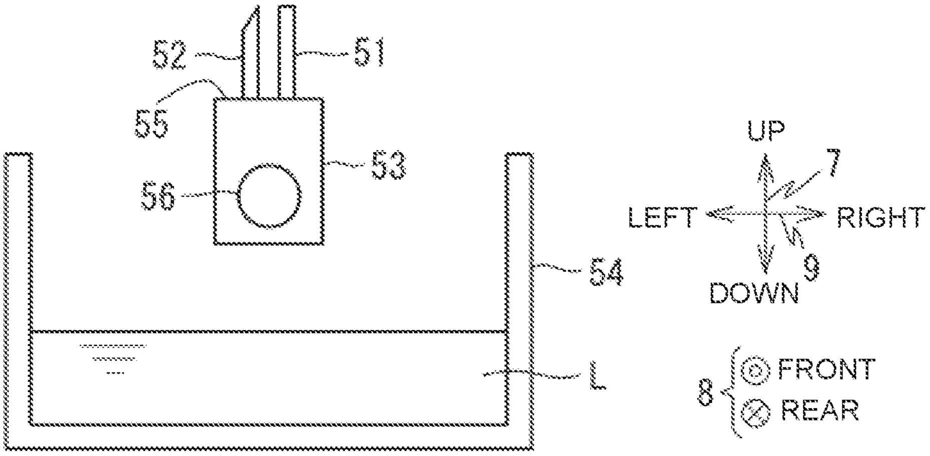
Figure 5B:
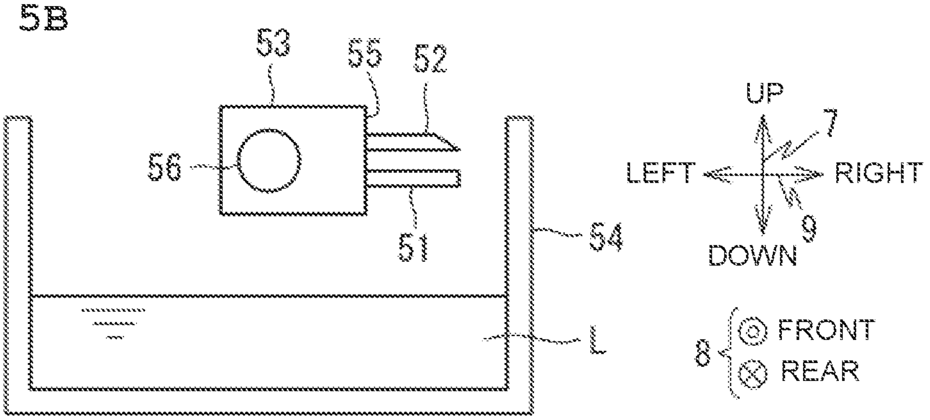
Figure 5C:
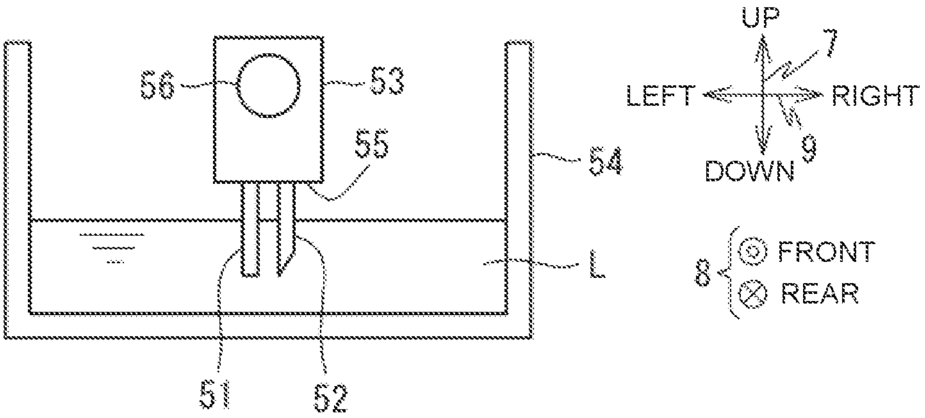

FIGS. 5A, 5B, and 5C are schematic views depicting states of the wiper unit 50.

FIG. 5A depicts an upward facing state, FIG. 5B depicts an intermediate state, and FIG. 5C depicts a downward facing state.

Figure 6:
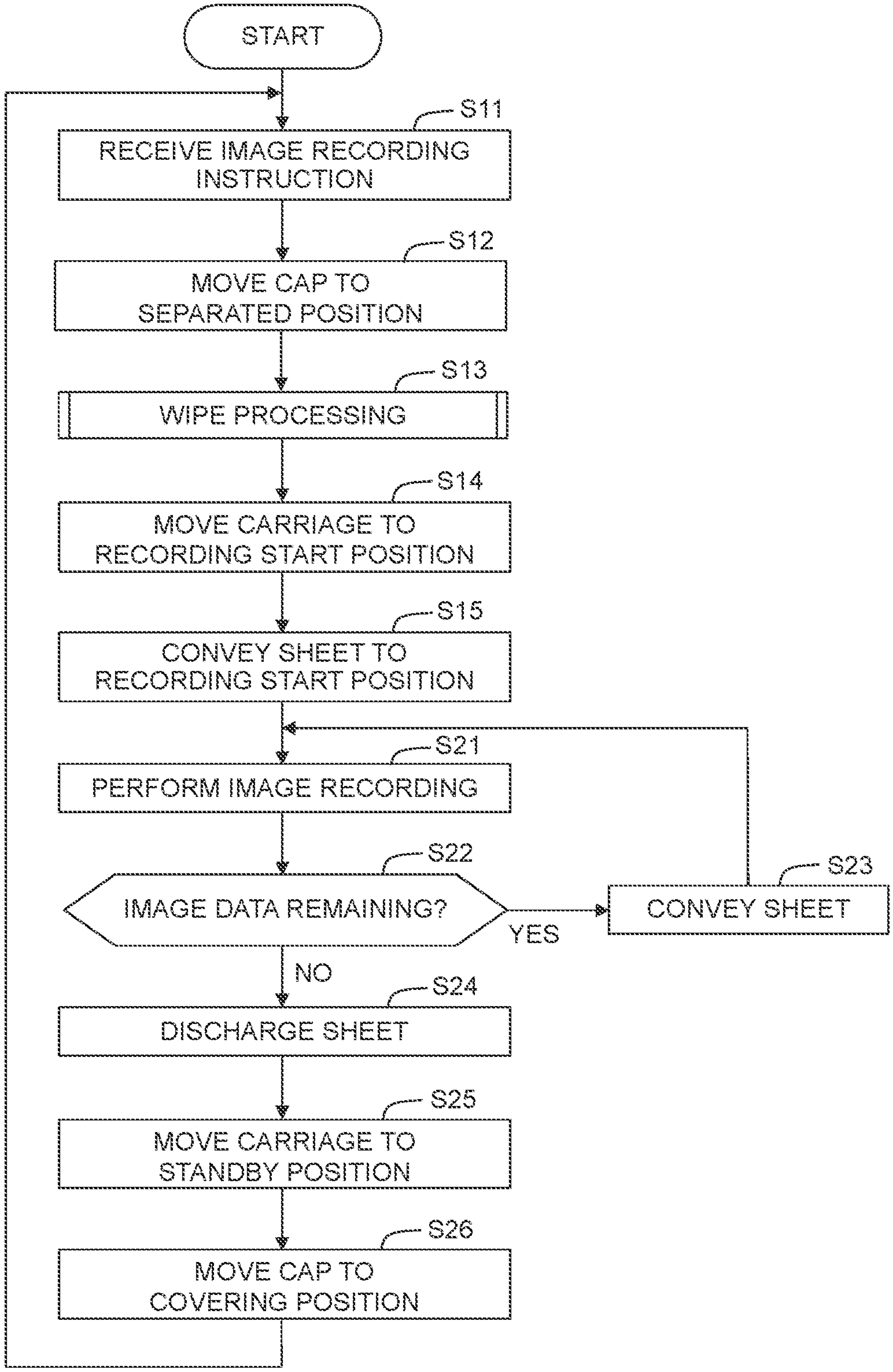

FIG. 6 is a flowchart depicting operation of the controller 60.

Figure 7:
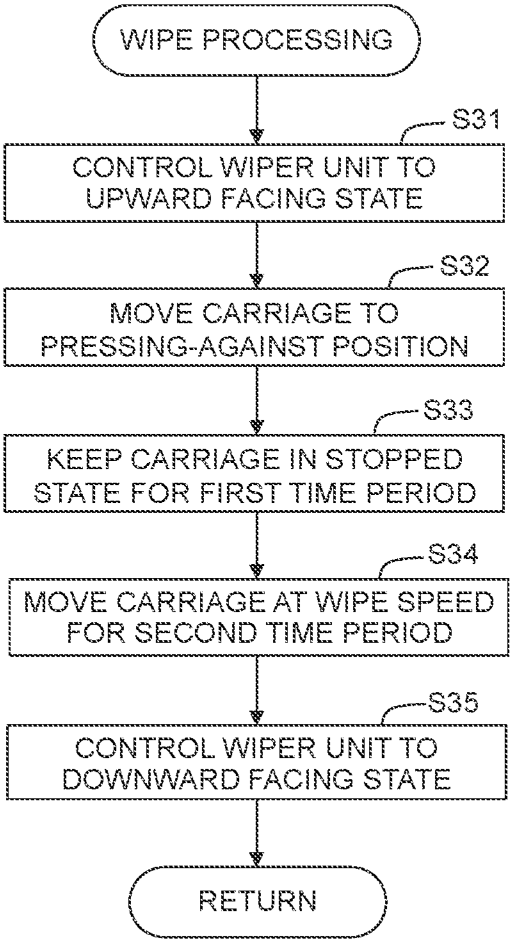

FIG. 7 is a flowchart of a wipe processing by the controller 60.

Figure 8A:
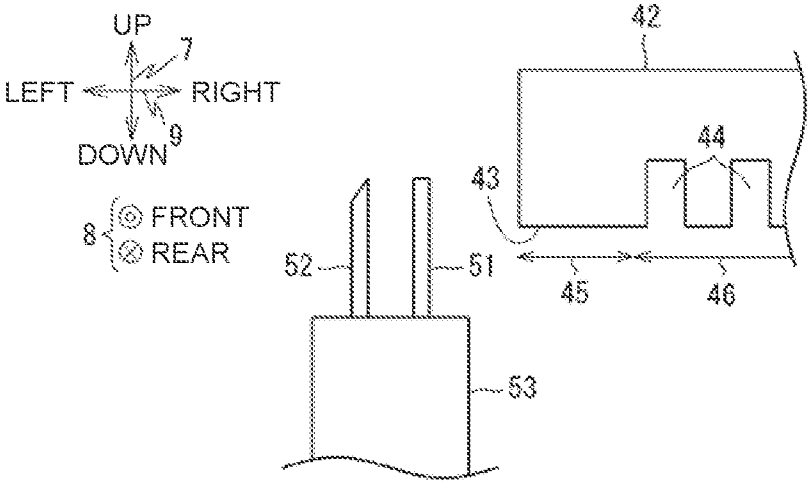
Figure 8B:
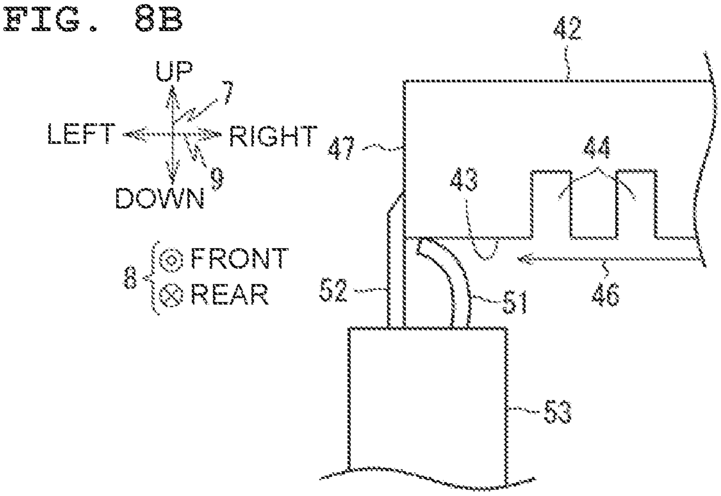
Figure 8C:
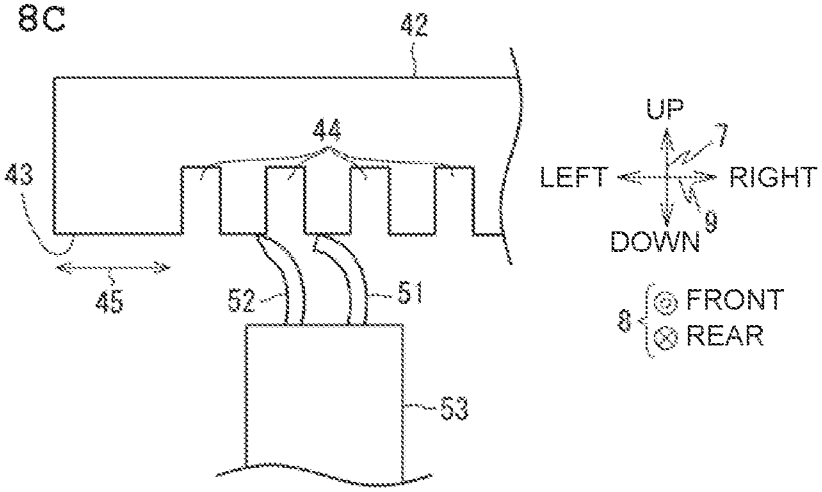

FIGS. 8A, 8B and 8C are schematic views depicting states of two wipers of the wiper unit 50. FIG. 8A depicts a state before a pressing-against processing, FIG. 8B depicts a state during the pressing-against processing, and FIG. 8C depicts a state during a moving processing.

Figure 9:
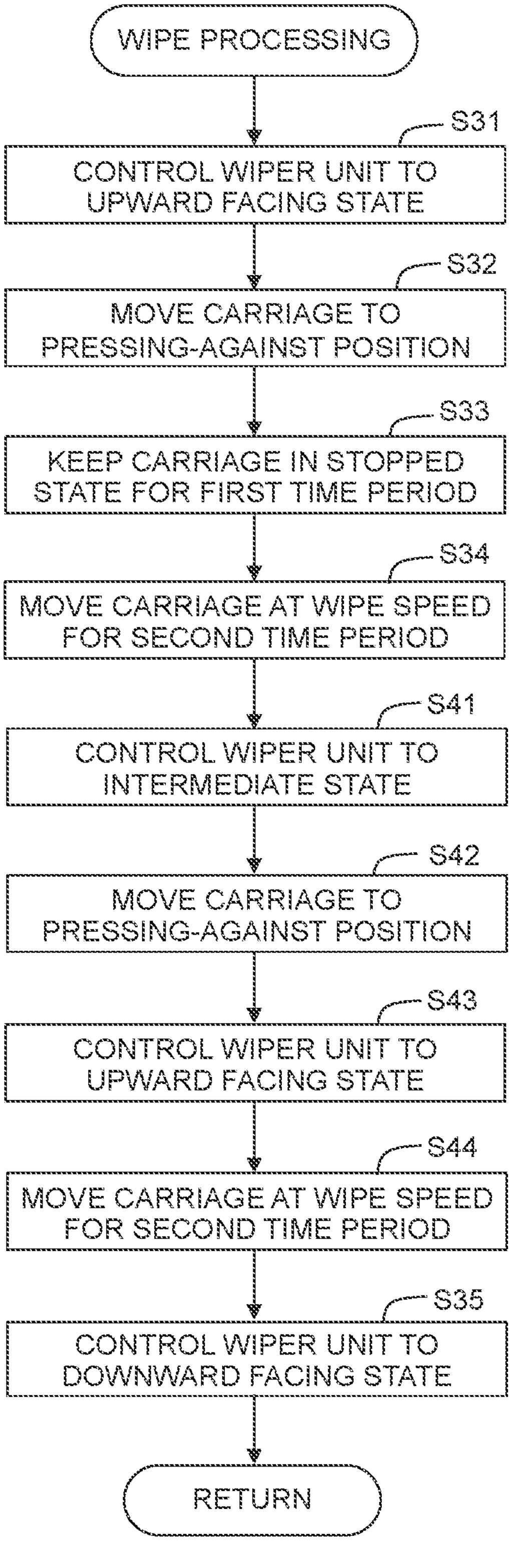

FIG. 9 is a flowchart of a wipe processing by a controller.

Figure 10:
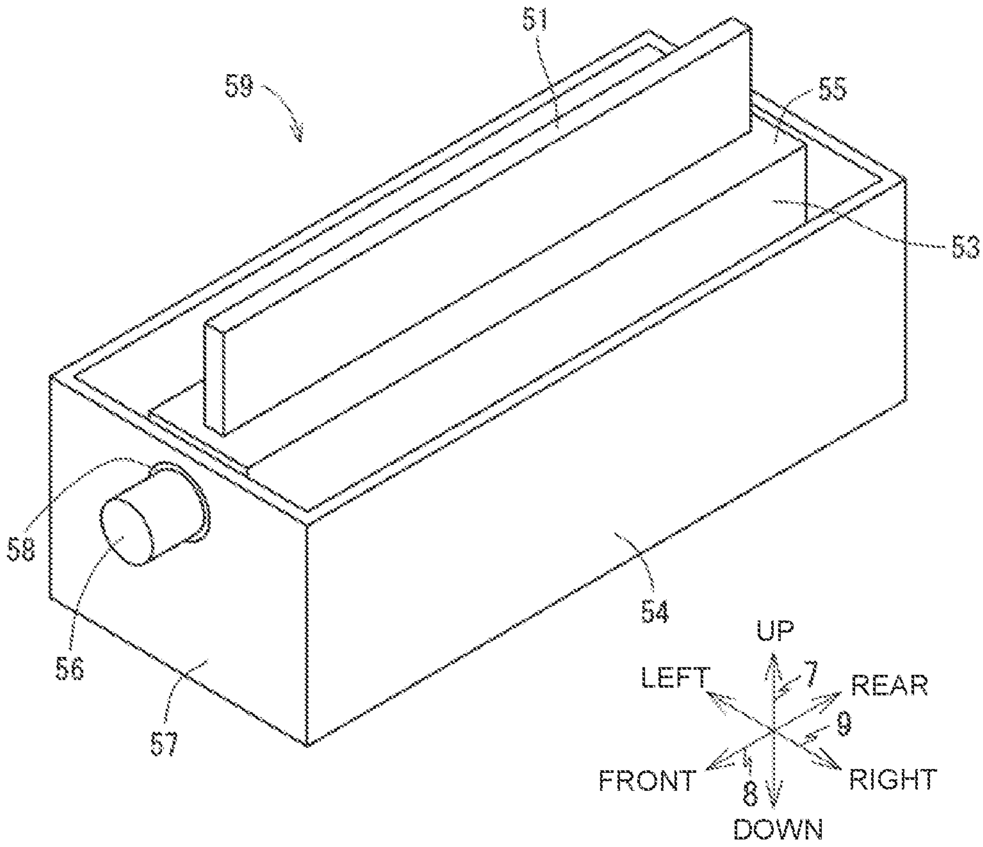

FIG. 10 is a perspective view of a wiper unit 59.

A printer 10 (one example of an image recording device) and controller 60 (one example of a controller) according to an embodiment of the present disclosure will be described below. Note that the embodiment described below is merely one example of the present disclosure, and it goes without saying that the embodiment of the present disclosure can be appropriately altered in a range not altering the gist of the present invention. In the description below, an up-down direction 7 is defined with reference to a state of the printer 10 having been usably installed (the state of FIG. 1), a front-rear direction 8 is defined assuming a surface provided with a discharge port 13 to be a front surface, and a left-right direction 9 is defined looking at the printer 10 from the front. The up-down direction 7, the front-rear direction 8, and the left-right direction 9 are orthogonal to each other.

Overall Configuration of Printer 10

Figure 1:
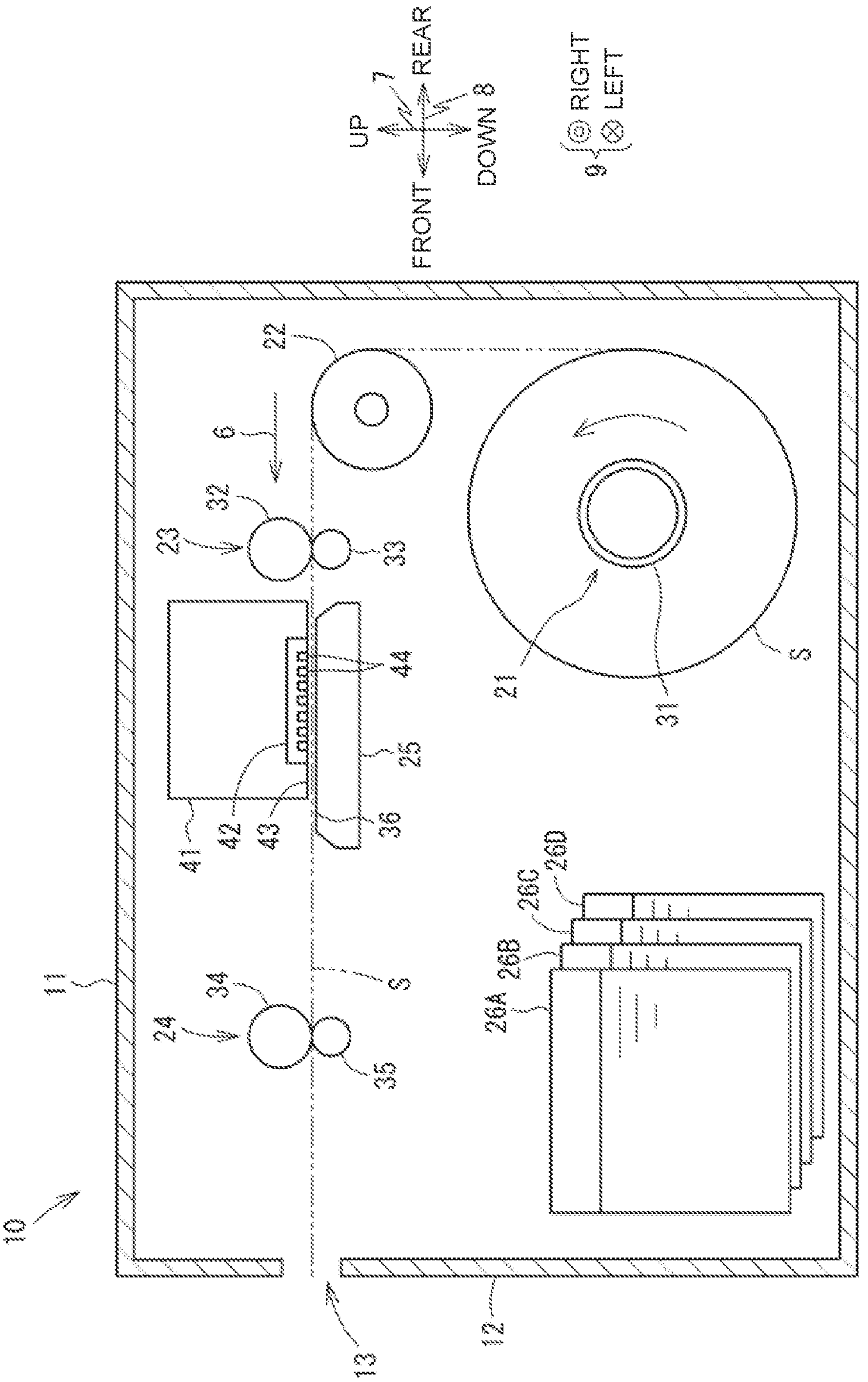
FIG. 1 is a schematic view depicting internal configuration of a printer 10.

The printer 10 depicted in FIG. 1 is an image recording device that records an image on a sheet S by an ink jet recording system. The sheet S is a long paper sheet that has been wound into a roll shape. In order for the sheet S to be mounted in the printer 10, a winding center of the sheet S has a through-hole formed therein. A recording objective medium may be the likes of a seal paper, fan-fold paper, cut paper, or a fabric.

The printer 10 includes a housing 11 of substantially rectangular parallelepiped shape. The housing 11 has a size enabling it to be mounted on a tabletop, on a floor, or in a rack, and so on. Located in a front wall 12 of the housing 11 is the discharge port 13 which is slit-like and extends in the left-right direction 9. The sheet S that has been recorded with an image by the printer 10 is discharged from the discharge port 13. The discharged sheet S is wound by a winding device (not depicted) attached to the printer 10, for example.

Figure 2:
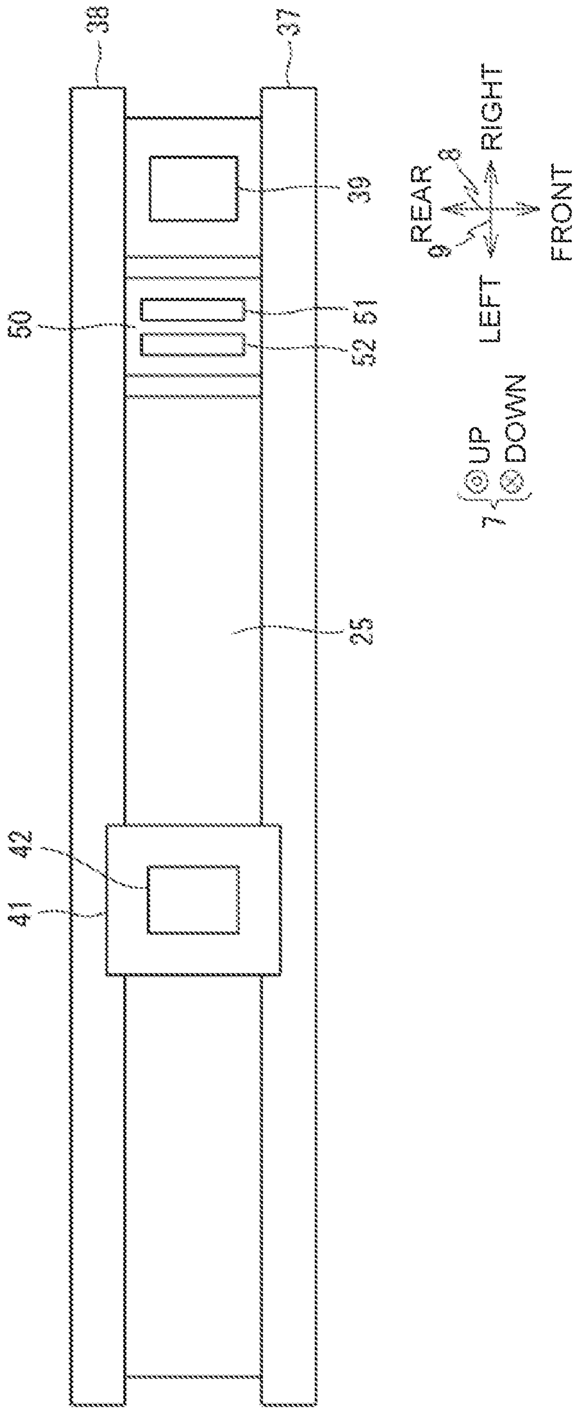
FIG. 2 is a diagram depicting a moving range of a carriage 41.
Figure 3:
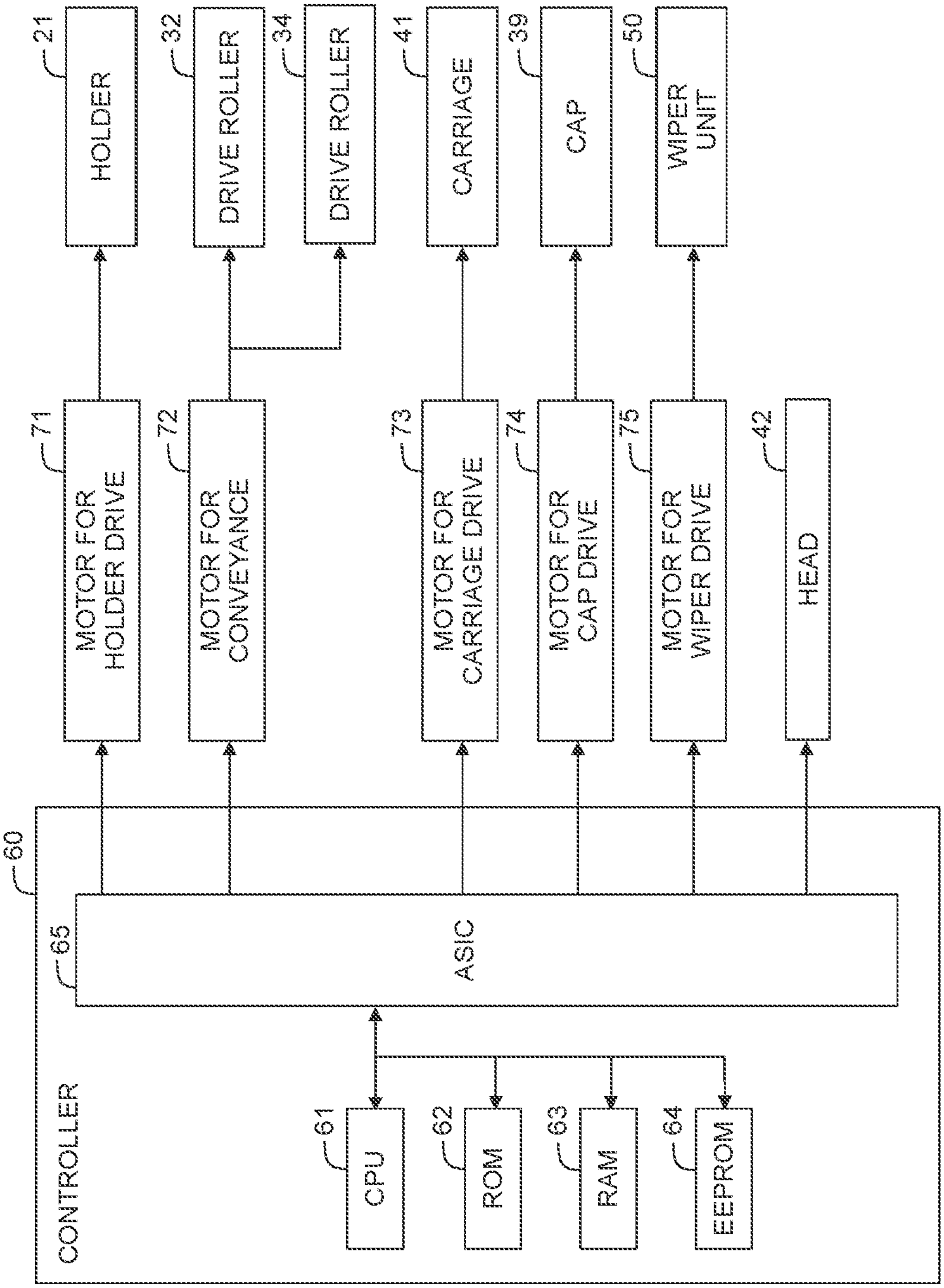
FIG. 3 is a block diagram depicting configuration of a controller 60 and elements connected to the controller 60.

As depicted in FIG. 1, the printer 10 includes the following within the housing 11, namely, a holder 21, a tensioner 22, a conveying roller pair 23, a discharging roller pair 24, a platen 25, four tanks 26A-26D, a carriage 41, and a head 42. The head 42 is mounted on the carriage 41. As depicted in FIG. 2, the printer 10 further includes the following within the housing 11, namely, two guide rails 37, 38, a cap 39, and a wiper unit 50. As depicted in FIG. 3, the printer 10 further includes the following within the housing 11, namely, the controller 60, a motor for holder drive 71, a motor for conveyance 72, a motor for carriage drive 73, a motor for cap drive 74, and a motor for wiper drive 75. The printer 10 may further include various kinds of sensors, and so on, besides the above-mentioned elements.

Tanks 26A-26D

The tanks 26A-26D respectively store yellow, magenta, cyan, and black inks. The inks, which are so-called latex inks, contain a pigment, resin fine particles, and an additive. The ink has a viscosity suitable for evenly dispersing the pigment and the resin fine particles. The pigment represents the color of the ink. The resin fine particles, which are for causing the pigment to adhere to the sheet S, are of a synthetic resin whose glass transition temperature is exceeded by heating of a heater (not depicted), for example.

Note that the printer 10 may include at least one tank. Moreover, the tank may store a liquid other than ink. The liquid stored in the tank is a preprocessing liquid, for example. The preprocessing liquid may contain a cationic polymer, a polyvalent metal salt (for example, a magnesium salt), or the like. The preprocessing liquid has a function of preventing running or bleeding-through of ink, due to it causing components in the ink to aggregate or precipitate. In some cases, the preprocessing liquid has a function of improving coloring or quick-drying properties of the ink.

Conveying Mechanism of Sheet S

Located inside the housing 11 are a pair of side frames (not depicted) that extend in the up-down direction 7 and the front-rear direction 8. The holder 21 has a rotating shaft 31 that supports the sheet S. The rotating shaft 31 extends in the left-right direction 9 and has its two ends fixed to the side frames. Motive power of the motor for holder drive 71 (see, FIG. 3) is transmitted to the rotating shaft 31. This motive power causes the holder 21 to rotate in a circumferential direction of the rotating shaft 31. In FIG. 1, a rotating direction of the holder 21 is counter-clockwise. Rotation of the holder 21 causes a roll body supported by the holder 21 to rotate too. The sheet S is led out upwardly from a rear end of the roll body and guided to the tensioner 22 as a result of the conveying roller pair 23 and discharging roller pair 24 rotating The tensioner 22, the conveying roller pair 23, and the discharging roller pair 24 each extend in the left-right direction 9 between the side frames and are installed in a manner enabling them to rotate in a circumferential direction of their rotational axes parallel to the left-right direction 9. The tensioner 22 is applied with a biasing force in a rearward direction by a biasing member such as a spring. The tensioner 22 abuts on the sheet S led out from the roll body and thereby guides the sheet S in such a manner that the sheet S curves frontwards.

The conveying roller pair 23 include a drive roller 32 and a pinch roller 33, and are located forward of the tensioner 22. The discharging roller pair 24 include a drive roller 34 and a pinch roller 35, and are located further forward than the conveying roller pair 23. Lower end positions of the drive rollers 32, 34 substantially coincide with an upper end position of the tensioner 22 in the up-down direction 7. The pinch roller 33 abuts from below on the drive roller 32. The pinch roller 35 abuts from below on the drive roller 34.

Motive power of the motor for conveyance 72 (see, FIG. 3) is transmitted to the drive rollers 32, 34. This motive power causes the drive rollers 32, 34 to rotate. As a result, the drive rollers 32, 34 nip the sheet S between themselves and the pinch rollers 33, 35, and, while doing so, convey the sheet S in a conveying direction 6. In the present embodiment, the conveying direction 6 is a frontward direction.

Platen 25

The platen 25 is attached to the side frames at a position between the conveying roller pair 23 and discharging roller pair 24 in the front-rear direction 8. The platen 25 extends in the left-right direction 9 between the side frames, and includes a supporting surface 36 of the sheet S, that extends in the front-rear direction 8 and the left-right direction 9. The supporting surface 36 is an upper end surface of the platen 25. A position in the up-down direction 7 of the supporting surface 36 substantially coincides with the upper end position of the tensioner 22. The platen 25 may be a sucking platen that sucks the sheet S onto the supporting surface 36.

Carriage 41 and Head 42

As depicted in FIG. 2, the guide rails 37, 38 extend in the left-right direction 9 parallelly to each other. Positions in the up-down direction 7 of the guide rails 37, 38 are the same. The guide rail 38 is located rearward of the guide rail 37 in the front-rear direction 8. Both ends of the guide rails 37, 38 are fixed to the side frames. The carriage 41 is supported by the guide rails 37, 38. Motive power of the motor for carriage drive 73 (see, FIG. 3) is transmitted to a carriage drive mechanism (not depicted). The carriage 41 moves in the left-right direction 9 due to action of the carriage drive mechanism, in a state of being supported by the guide rails 37, 38. The left-right direction 9 is an example of a first direction.

As depicted in FIG. 1, the head 42 is mounted on the carriage 41. A lower surface of the head 42 is referred to as a nozzle surface 43. A plurality of nozzles 44 each configured to discharging ink is formed in the nozzle surface 43. The tanks 26A-26D and the head 42 are connected via ink channels (not depicted). Inks stored in the tanks 26A-26D are supplied to the head 42 via the ink channels. While the carriage 41 is moving in the left-right direction 9, inks that have been supplied to the head 42 are discharged from the nozzles 44. As a result, image recording is performed on the sheet S.

Controller 60

As depicted in FIG. 3, the controller 60 has a CPU 61, a ROM 62, a RAM 63, an EEPROM 64, and an ASIC 65. The ROM 62 stores the likes of various kinds of data required in operation of the controller 60. The RAM 63 is a working memory of the CPU 61. The EEPROM 64 stores the likes of a control program executed by the CPU 61. Prior to image recording being executed by the printer 10, the control program stored in the EEPROM 64 is copied to the RAM 63. The CPU 61 executes the control program stored in the RAM 63. As a result, the controller 60 executes an image recording processing and a wipe processing that will be described later.

The controller 60 is electrically connected to the motor for holder drive 71, the motor for conveyance 72, the motor for carriage drive 73, the motor for cap drive 74, the motor for wiper drive 75, and the head 42, via the ASIC 65. The motor for holder drive 71, the motor for conveyance 72, the motor for carriage drive 73, the motor for cap drive 74, and the motor for wiper drive 75 rotate according to control from the controller 60, and generate motive power. The head 42 discharges ink onto the sheet S conveyed on the platen 25, according to control from the controller 60.

The holder 21 rotates due to motive power from the motor for holder drive 71. The drive rollers 32, 34 rotate due to motive power from the motor for conveyance 72. The sheet S is conveyed in the conveying direction 6 due to motive power from the motor for conveyance 72. The carriage 41 moves in the left-right direction 9 due to motive power from the motor for carriage drive 73. The cap 39 moves in the up-down direction 7 between a relatively high covering position and a relatively low separated position, due to motive power from the motor for cap drive 74. The wiper unit 50 rotates due to motive power from the motor for wiper drive 75, and has its state changed between the three states depicted in FIGS. 5A to 5C. Note that some of the motor for holder drive 71, the motor for conveyance 72, the motor for carriage drive 73, the motor for cap drive 74, and the motor for wiper drive 75 may be realized by a common motor (that is, one motor functioning as two or more of them).

Moving Range of Carriage 41, and Cap 39

As depicted in FIG. 2, the platen 25, which has a shape long in the left-right direction 9, is located below the carriage 41 in the up-down direction 7 (see, FIG. 1). A left end of the platen 25 is located close to left ends of the guide rails 37, 38 in the left-right direction 9. A right end of the platen 25 is located further to the right than centers of the guide rails 37, 38 in the left-right direction 9. The wiper unit 50 is located to the right of the platen 25 in the left-right direction 9. The cap 39 is located further to the right of the wiper unit 50, close to right ends of the guide rails 37, 38 in the left-right direction 9. While image recording is being executed by the printer 10, the carriage 41 moves in the left-right direction 9 within a range of the platen 25. While image recording is not being executed by the printer 10, the carriage 41 is located in a position at which the head 42 will face the cap 39 (hereafter, referred to as a standby position).

When the carriage 41 is located in the standby position, the cap 39 is located in the covering position. The cap 39 located in the covering position covers the nozzle surface 43 of the head 42. When the carriage 41 is located in other than the standby position, the cap 39 is located in the separated position. The cap 39 located in the separated position does not cover the nozzle surface 43 of the head 42. In this way, the cap 39 has a function of covering the nozzle surface 43 of the head 42 while image recording is not being executed.

Wiper Unit 50

Figure 4:
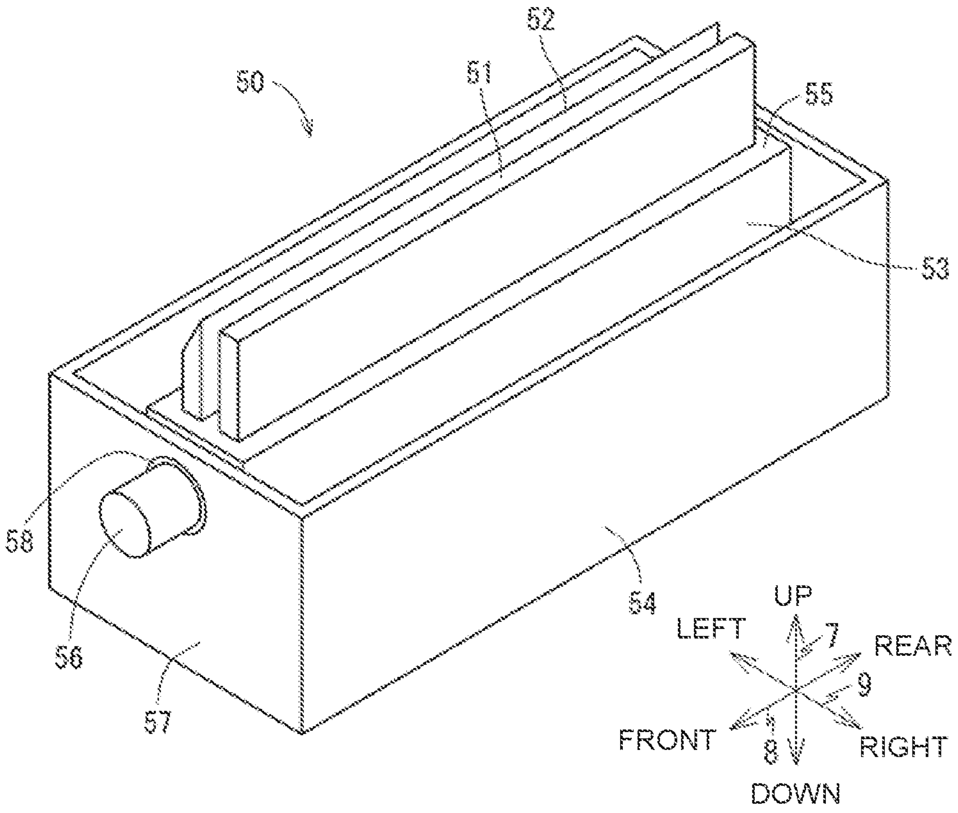
FIG. 4 is a perspective view of a wiper unit 50.

As depicted in FIG. 4, the wiper unit 50 has a first wiper 51, a second wiper 52, a wiper supporting portion 53, and a cleaning liquid tub 54. The cleaning liquid tub 54 is shaped like an open-topped box. As depicted in FIGS. 4 and 5A to 5C, the cleaning liquid tub 54, which is located at the lower part of the wiper unit 50, stores a cleaning liquid L. The cleaning liquid L is a liquid suitable for removing an unnecessary object that has adhered to the nozzle surface 43 of the head 42. Glycerin, for example, is used for the cleaning liquid L.

The first wiper 51 is shaped like a rectangular parallelepiped whose length in the front-rear direction 8 is long, and whose length in the left-right direction 9 is short. The length in the front-rear direction 8 of the first wiper 51 is shorter than a length in the front-rear direction 8 of the wiper supporting portion 53. The second wiper 52 has substantially the same shape and size as the first wiper 51. However, when cut in a plane orthogonal to the front-rear direction 8, cross-sectional shape of the first wiper 51 is rectangular, whereas cross-sectional shape of the second wiper 52 is trapezoidal. Hereafter, the first wiper 51 and the second wiper 52 will be collectively referred to as two wipers.

The first wiper 51, which is capable of being impregnated with the cleaning liquid L, deforms with a high degree of freedom in response to an external force. On the other hand, the second wiper 52, which is not capable of being impregnated with the cleaning liquid L, deforms while keeping the shape of the second wiper 52 to a certain extent, in response to an external force. The first wiper 51 is formed by a porous material, for example. The second wiper 52 is formed by a rubber material, for example. The first wiper 51 is one example of a wiper. The second wiper 52 is one example of an additional wiper.

The wiper supporting portion 53, which has a shape whose length in the front-rear direction 8 is long, includes a attachment surface 55 and a rotating shaft 56. The first wiper 51 is attached to the attachment surface 55 so that its longitudinal direction coincides with the front-rear direction 8. The second wiper 52 is attached to the attachment surface 55 so as to face the first wiper 51. The two wipers are attached to the attachment surface 55 so that in a state of the attachment surface 55 facing upward, the first wiper 51 will be located further to the right than the second wiper 52 in the left-right direction 9.

The cleaning liquid tub 54 has a front wall 57 and rear wall (not depicted) that extend in the up-down direction 7 and the left-right direction 9. The front wall 57 and rear wall each have a through-hole in their central upper portion (in FIG. 4, only the through-hole 58 of the front wall 57 is depicted). One end of the rotating shaft 56 is inserted in the through-hole 58 of the front wall 57. The other end (not depicted) of the rotating shaft 56 is inserted in the through-hole of the rear wall. As a result, the wiper supporting portion 53 is supported by the cleaning liquid tub 54 in a manner enabling the wiper supporting portion 53 to rotate around the rotating shaft 56. Motive power of the motor for wiper drive 75 (see, FIG. 3) is transmitted to a wiper drive mechanism (not depicted). The rotating shaft 56 undergoes a half-rotation due to action of the wiper drive mechanism. As a result, the first wiper 51, second wiper 52, and wiper supporting portion 53 also undergo a half-rotation around the rotating shaft 56. Note that configuration of the wiper drive mechanism may be any configuration.

As depicted in FIGS. 5A to 5C, the wiper unit 50 has its state changed between an upward facing state, an intermediate state, and a downward facing state, due to undergoing a half-rotation around the rotating shaft 56. The upward facing state (FIG. 5A) is a state of the attachment surface 55 facing upward. The intermediate state (FIG. 5B) is a state of the attachment surface 55 facing rightward. The downward facing state (FIG. 5C) is a state of the attachment surface 55 facing downward.

In the upward facing state, the two wipers are not immersed in the cleaning liquid L stored in the cleaning liquid tub 54, and are located in a position allowing the two wipers to abut on the nozzle surface 43 of the head 42. In the downward facing state, part of the first wiper 51 and part of the second wiper 52 are immersed in the liquid L stored in the cleaning liquid tub 54, and the two wipers are located in a position where the two wipers cannot abut on the nozzle surface 43. The intermediate state is a state midway between the upward facing state and the downward facing state. In the intermediate state, the two wipers are not immersed in the cleaning liquid L stored in the cleaning liquid tub 54, and are located in a position where they cannot abut on the nozzle surface 43. Note that in the downward facing state, the whole of the first wiper 51 and whole of the second wiper 52 may be immersed in the cleaning liquid L.

While image recording is not being performed, the carriage 41 is located in the standby position, and the wiper unit 50 is in the downward facing state. In this period, the first wiper 51 is impregnated with the cleaning liquid L stored in the cleaning liquid tub 54. The controller 60 receives an image recording instruction, and thereupon moves the carriage 41 from the standby position to a recording start position to execute image recording. After receiving the image recording instruction but before executing image recording, the controller 60 uses the wiper unit 50 to execute the wipe processing depicted in FIG. 7.

Operation of Controller 60

Operation of the controller 60 will be described with reference to FIG. 6. At a timepoint when the controller 60 has reached a step S11, the carriage 41 is located in the standby position, the cap 39 is located in the covering position, and the wiper unit 50 is in the downward facing state. At this time, the nozzle surface 43 of the head 42 is covered by the cap 39, and part of the first wiper 51 and part of the second wiper 52 are immersed in the cleaning liquid L stored in the cleaning liquid tub 54. The first wiper 51 is in a state of having been impregnated with the cleaning liquid L.

The controller 60 receives an image recording instruction from an operating unit (not depicted) (S11). Specifically, the controller 60 waits in the step S11 until it receives the image recording instruction. Upon receiving the image recording instruction in the step S11, the controller 60 moves the cap 39 from the covering position to the separated position (S12). Next, the controller 60 executes the wipe processing (details of which will be described later) (S13). At a timepoint when the controller 60 has completed processing up to the step S13, the carriage 41 is located to the left of the wiper unit 50 in the left-right direction 9.

Next, the controller 60 moves the carriage 41 in a leftward direction to a recording start position (S14). The recording start position is a predetermined position at which the carriage 41 will face the platen 25. Next, the controller 60 conveys the sheet S to the recording start position (S15). Note that the controller 60 may execute the step S15 parallelly to the whole or part of the steps from the step S12 to the step S14. At a timepoint when the controller 60 has completed processing up to the step S15, the printer 10 is in a state allowing image recording to be executed.

Next, the controller 60 executes image recording on the sheet S (S21). In the step S21, the controller 60 moves the carriage 41 in the left-right direction 9 (in a leftward direction or rightward direction). While the carriage 41 is moving in the left-right direction 9, the controller 60 causes ink as much as a quantity corresponding to image data to be discharged from the nozzles 44 of the head 42.

Next, the controller 60 determines whether there is image data remaining (S22). In response to having determined there to be image data remaining in the step S22 (S22: Yes), the controller 60 proceeds to a step S23. In this case, the controller 60 conveys the sheet S a predetermined amount (S23), and proceeds to the step S21.

In response to having determined there to be no image data remaining in the step S22 (S22: No), the controller 60 proceeds to a step S24. In this case, the controller 60 discharges the sheet S to a predetermined position (S24). At a timepoint when the controller 60 has completed processing up to the step S24, the printer 10 is in a state of having completed the image recording.

Next, the controller 60 moves the carriage 41 in a rightward direction to the standby position (S25). Next, the controller 60 moves the cap 39 in an upward direction from the separated position to the covering position (S26). After that, the controller 60 proceeds to the step S11 in order to execute the next image recording.

Details of the wipe processing executed by the controller 60 will be described with reference to FIGS. 7 and 8A to 8C. At a timepoint when the controller 60 starts execution of the wipe processing, the carriage 41 is located in the standby position, the cap 39 is located in the separated position, and the wiper unit 50 is in the downward facing state.

The standby position is located further to the right than the wiper unit 50 in the left-right direction 9. At a timepoint when the controller 60 starts execution of the wipe processing, the carriage 41 is located further to the right than the wiper unit 50 in the left-right direction 9. As depicted in FIG. 8A, the nozzle surface 43 of the head 42 includes: a first region 45 not having the nozzles 44; and a second region 46 having the nozzles 44.

The controller 60 controls the wiper unit 50 to the upward facing state at the start of the wipe processing (S31). Upon the wiper unit 50 changing its state from the downward facing state to the upward facing state, the two wipers emerge (come out) from the cleaning liquid L stored in the cleaning liquid tub 54 to be in an upright state (see, FIG. 8A). In the course of the wiper unit 50 changing its state from the downward facing state to the upward facing state, and while the wiper unit 50 is in the upward facing state, some of the cleaning liquid that the first wiper 51 has been impregnated with, and cleaning liquid that has adhered to a surface of the second wiper 52 moves in a downward direction due to action of gravity, and is collected in the cleaning liquid tub 54.

Next, the controller 60 moves the carriage 41 in a leftward direction to a pressing-against position (S32). The pressing-against position is a position of the carriage 41 by which the first wiper 51 will abut on the first region 45 (the region not having the nozzles 44) of the nozzle surface 43 (see, FIG. 8B). The pressing-against position may be a position of the carriage 41 at which, for example, the first wiper 51 will abut on the first region 45 and the second wiper 52 will abut on a side surface 47 of the head 42. By setting the pressing-against position to the above-described position, the cleaning liquid that has adhered to the head 42 when the head 42 is abutted on by the first wiper 51 can be recovered in the cleaning liquid tub 54 via the second wiper 52. Note that, a moving speed of the carriage 41 until it reaches the pressing-against position may be any speed.

Next, the controller 60 keeps the carriage 41 in a stopped state for a first time period at the pressing-against position (S33). The step S33 is one example of pressing-against processing. While the carriage 41 is stopped at the pressing-against position, the first wiper 51 abuts on the first region 45, and the first wiper 51 deforms with its tip portion bending to the left (see, FIG. 8B). As a result, the first wiper 51 is squeezed, and some of the cleaning liquid with which the first wiper 51 has been impregnated separates from the first wiper 51. The cleaning liquid that has separated from the first wiper 51 moves in a downward direction due to action of gravity, and is recovered in the cleaning liquid tub 54. Length of the first time period is determined according to the likes of material (quality of material) of the first wiper 51, characteristics of the cleaning liquid, and degree of deformation of the first wiper 51, for example. The first time period is one second or more, for example.

Next, the controller 60 moves the carriage 41 in a leftward direction at a speed suitable for wiping the nozzle surface 43 of the head 42 (hereafter, referred to as a wipe speed), for a second time period (S34). The step S34 is one example of a moving processing. While the step S34 is being executed by the controller 60, the first wiper 51 abuts on the second region 46 (the region having the nozzles 44) of the nozzle surface 43. At this time, the two wipers abut on the second region 46, and the two wipers deform with their tip portions bending to the left (see, FIG. 8C). Thus, due to the carriage 41 moving in a leftward direction in a state of the second region 46 having been abutted on by the two wipers, an unnecessary object that has adhered to the nozzle surface 43 of the head 42 is removed.

Note that in the step S34, the controller 60 accelerates the carriage 41 in the stopped-state to the wipe speed, and then moves the carriage 41 at the wipe speed for the second time period. During the second time period, a moving speed of the carriage 41 is constant (is always the wipe speed), and a time period that the carriage 41 is accelerating is not included in the second time period.

Next, the controller 60 controls the wiper unit 50 to the downward facing state (S35). Upon the wiper unit 50 changing its state from the upward facing state to the downward facing state, part of the first wiper 51 and part of the second wiper 52 are again immersed in the cleaning liquid L stored in the cleaning liquid tub 54 (see, FIG. 5C). Subsequently, the controller 60 executes the processing of the step S14 and the steps following the step S14 depicted in FIG. 6.

Effects of Embodiment

As described above, the controller 60 executes: the pressing-against processing in which the carriage 41 is kept in a stopped state at the pressing position for the first time period, and the first wiper 51 is abutted on the first region 45; and the moving processing in which, while the first wiper 51 is abutting on the second region 46, the carriage 41 is moved in a leftward direction at the wipe speed.

The printer 10 and controller 60 according to the present embodiment result in that by the pressing-against processing being executed, the first wiper 51 that has been impregnated with the cleaning liquid is squeezed, and the cleaning liquid with which the first wiper 51 has been impregnated is reduced to a suitable amount. The pressing-against processing can be executed without a dedicated member being employed. Hence, by the moving processing being executed subsequently to the pressing-against processing, wiper processing employing a suitable amount of cleaning liquid can be executed by a simple configuration.

When relative moving speed of the carriage 41 and first wiper 51 during pressing-against processing is assumed to be the first speed, and relative moving speed of the carriage 41 and first wiper 51 during moving processing is assumed to be the second speed, the first speed is zero, and the second speed is the wipe speed. The second speed is faster than the first speed. Since the first speed is zero, the first wiper 51 is squeezed in a state of the carriage 41 and first wiper 51 having been relatively stopped.

In the moving processing, the controller 60 moves the carriage 41 in a leftward direction along the left-right direction 9 at the wipe speed, in a state of the second wiper 52 having been abutted on the second region 46. This results in that after the nozzle surface 43 has been applied with a suitable amount of the cleaning liquid using the first wiper 51, the cleaning liquid and an unnecessary object that have adhered to the nozzle surface 43 can be removed using the second wiper 52.

By the controller 60 executing the pressing-against processing in a state of the second wiper 52 having been abutted on the side surface 47 of the head 42, the cleaning liquid that has adhered to the head 42 can be removed via the second wiper 52. Due to the first time period being set at one second or more, the first wiper 51 is squeezed for a sufficient time.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modifications

In the above-described embodiment, the controller 60 keeps the carriage 41 in a stopped state for the first time period in the pressing-against processing. In a first modification, the controller 60 moves the carriage 41 at a speed greater than zero for the first time period in the pressing-against processing. That is, in the first modification, the first speed (the relative moving speed of the carriage 41 and first wiper 51 during the pressing-against processing) is greater than zero. In such a first modification too, the first wiper 51 that has been impregnated with the cleaning liquid is squeezed, and the cleaning liquid with which the first wiper 51 has been impregnated is reduced to a suitable amount, in the pressing-against processing. Since the first speed is greater than zero, the first wiper 51 is squeezed in a state of the carriage 41 and first wiper 51 moving relative to each other.

In the above-described embodiment, controller 60 moves the carriage 41 in the left-right direction 9 (specifically, in a leftward direction), without moving the two wipers in the left-right direction 9, when executing wipe processing. In a second modification, the controller 60 moves the two wipers in the left-right direction 9, without moving the carriage 41 in the left-right direction 9, when executing wipe processing. Alternatively, the controller 60 moves both the carriage 41 and two wipers in the left-right direction 9, when executing wipe processing.

Generally, in the pressing-against processing, the controller 60 may move the carriage 41 and first wiper 51 relative to each other in the left-right direction 9 for the first time period at the first speed, while abutting the first wiper 51 on the first region 45. In the moving processing, the controller 60 may move the carriage 41 and first wiper 51 relative to each other in the left-right direction 9 at the second speed faster than the first speed, while abutting the first wiper 51 on the second region 46.

The controller 60 may move the carriage 41 and first wiper 51 relative to each other in a moving direction in the pressing-against processing, and then, move the carriage 41 and first wiper 51 relative to each other in an opposite direction opposite to the moving direction of the pressing-against processing in the moving processing. Meanwhile the controller 60 may move the carriage 41 and first wiper 51 relative to each other in the moving processing without moving the carriage 41 and first wiper 51 relative to each other in the opposite direction. By doing so, the moving processing can be executed immediately after the pressing-against processing.

In the above-described embodiment, controller 60 executes the wipe processing depicted in FIG. 7, in the step S13. In a third modification, the controller 60 executes the wipe processing depicted in FIG. 9, in the step S13. The wipe processing depicted in FIG. 9 is the wipe processing depicted in FIG. 7 to which step S41-S44 have been added.

In the wipe processing depicted in FIG. 9, the controller 60 execute the steps S31-S34, after which the controller 60 controls the wiper unit 50 to the intermediate state (S41). In the intermediate state, the two wipers are not immersed in the cleaning liquid L stored in the cleaning liquid tub 54, and are located in a position where the two wipers are unable to abut on the nozzle surface 43 of the head 42.

Next, the controller 60 moves the carriage 41 in a rightward direction to the pressing-against position (S42). The pressing-against position is a position of the carriage 41 when moving processing is started. Note that in the step S42, the controller 60 may move the carriage 41 to the position where moving processing is started or to a position separated rightward from the position where moving processing is started.

Next, the controller 60 controls the wiper unit 50 to the upward facing state (S43). Next, the controller 60 moves the carriage 41 in a leftward direction at the wipe speed for the second time period (S44). Processing of the step S44 is the same as processing of the step S34. The controller 60 does not execute pressing-against processing in the process between the step S42 and the step S44. Next, the controller 60 controls the wiper unit 50 to the downward facing state (S35).

In the third modification, subsequent to moving processing, the controller 60 moves the carriage 41 to the position where moving processing is started or to a position further from the position where moving processing is ended as compared with the position where moving processing is started, without causing the two wipers to abut on the head 42, and re-executes the moving processing. In the third modification, pressing-against processing is executed prior to executing moving processing for the first time, so an amount of the cleaning liquid with which the first wiper 51 is impregnated will be still suitable when executing moving processing for the second time. Hence, the nozzle surface 43 of the head 42 can be wiped twice using a suitable amount of the cleaning liquid.

In the above-described embodiment, the printer 10 includes the wiper unit 50 depicted in FIG. 4. In a fourth modification, the printer 10 includes a wiper unit 59 depicted in FIG. 10. The wiper unit 59 depicted in FIG. 10 has the first wiper 51, the wiper supporting portion 53, and the cleaning liquid tub 54, but does not have the second wiper 52. Thus, the printer need not include a second wiper not capable of being impregnated with the cleaning liquid.

In the above-described embodiment, in the moving processing after the pressing-against processing, the controller 60 moves the carriage 41 in the same direction (leftward direction) as a moving direction of the carriage 41 prior to pressing-against processing, without moving the carriage 41 in an direction (rightward direction) opposite to the moving direction of the carriage 41 prior to pressing-against processing. In a fifth modification, the controller 60 moves the carriage 41 in the direction (rightward direction) opposite to the moving direction of the carriage 41 prior to pressing-against processing for a predetermined time, after which the controller 60 moves the carriage 41 in the same direction (leftward direction) as the moving direction of the carriage 41 prior to pressing-against processing, in the moving processing after the pressing-against processing.

In the above-described embodiment, the printer 10 includes one head 42. However, the printer 10 may include two or more heads 42. In the above-described embodiment, the printer 10 includes four tanks 26A-26D. However, the printer 10 may include three or fewer, or five or more tanks.

Moreover, characteristics of the printers and controllers according to the above-described embodiment and its modifications may be arbitrarily combined provided there occurs no contradiction with those characteristics, and there may thereby be configured printers and controllers that combine the characteristics of the printers and controllers according to the above-described embodiments and modifications.

What is claimed is:

1. A controller for an image recording device, the image recording device including: a carriage capable of moving in a first direction; a head which is mounted on the carriage and which is configured to discharge a liquid from a nozzle; and a wiper capable of being impregnated with a cleaning liquid, a nozzle surface of the head including a first region not having the nozzle and a second region having the nozzle, the controller being configured to execute:

a pressing-against processing of abutting the wiper on the first region in a state in which a speed of a relative movement in the first direction between the carriage and the wiper is a first speed; and then a moving processing of moving the carriage and the wiper relative to each other in the first direction at a second speed faster than the first speed, while abutting the wiper on the second region, after the executing of the pressing-against processing, contact between the wiper and the head being maintained from an end of the pressing-against processing to a beginning of the moving processing.

2. The controller according to claim 1, wherein the first speed is zero.

3. The controller according to claim 1, wherein the first speed is greater than zero.

4. The controller according to claim 1, wherein the image recording device further includes an additional wiper not capable of being impregnated with the cleaning liquid; and in the moving processing, the carriage and the additional wiper are moved relative to each other in the first direction at the second speed, in a state in which the additional wiper abuts on the second region.

5. The controller according to claim 4, wherein the pressing-against processing is executed in a state in which the additional wiper abuts on a side surface of the head.

6. The controller according to claim 1, wherein:

in the pressing-against processing, the carriage and the wiper are moved relative to each other in a moving direction; and then, in the moving processing, the carriage and the wiper are moved relative to each other in the moving direction, without being moved relative to each other in a direction opposite to the moving direction.

7. The controller according to claim 1, wherein the controller is configured to:

after the moving processing, move the carriage and the wiper relative to each other, in a state in which the wiper does not abut on the head, until the wiper is located relative to the head at a starting position or at a position further from an ending position as compared with the starting position, the starting position being a position of the wiper relative to the head when the moving processing is started, the ending position being a position of the wiper relative to the head when the moving processing is ended; and execute the moving processing again.

8. The controller according to claim 1, wherein the controller is configured to execute the pressing-against processing for one second or more.

9. A control method for an image recording device, the image recording device including: a carriage capable of moving in a first direction; a head which is mounted on the carriage and which is configured to discharges a liquid from a nozzle; and a wiper capable of being impregnated with a cleaning liquid, a nozzle surface of the head including a first region not having the nozzle and a second region having the nozzle, the control method comprising:

executing a pressing-against processing of abutting the wiper on the first region in a state in which a speed of a relative movement in the first direction between the carriage and the wiper is a first speed; and then executing a moving processing of moving the carriage and the wiper relative to each other in the first direction at a second speed faster than the first speed, while abutting the wiper on the second region, after the executing of the pressing-against processing, contact between the wiper and the head being maintained from an end of the pressing-against processing to a beginning of the moving processing.

10. An image recording device comprising:

a carriage capable of moving in a first direction;

a head which is mounted on the carriage and which is configured to discharge a liquid from a nozzle;

a wiper capable of being impregnated with a cleaning liquid; and a controller as defined in claim 1, wherein a nozzle surface of the head includes a first region not having a nozzle and a second region having a nozzle.

* * * * *